US006418630B1

(12) United States Patent
Genevois

(10) Patent No.: US 6,418,630 B1

(45) Date of Patent: Jul. 16, 2002

(54) DEVIATION CALCULATION RULE USED TO MONITOR THE DRILLING PATH OF A TWO DIMENSIONAL DEVIATED HOLE

(75) Inventor: Jean-Michel Genevois, Verneuil-sur-Seine (FR)

(73) Assignee: Total Fina Elf S.A., Courbevoie (FR)

(*) Notice: Subject to any disclaimer, the term of this patent is extended or adjusted under 35 U.S.C. 154(b) by 46 days.

(21) Appl. No.: 09/736,293

(22) Filed: Dec. 15, 2000

(30) Foreign Application Priority Data

Dec. 17, 1999 (FR) ........................................... 99 15974

(51) Int. Cl.[7] ........................... G06G 1/10; G06G 1/04; G01C 21/20

(52) U.S. Cl. ......................... 33/15 B; 33/15 D; 33/303; 33/430

(58) Field of Search ............................... 33/15 B, 15 D, 33/301, 302, 303, 304, 430, 431, 433, 435, 436, 437, 446

(56) References Cited

U.S. PATENT DOCUMENTS

| | | | | |
|---|---|---|---|---|
| 2,110,087 A | * | 3/1938 | Kuhn | 33/435 |
| 2,280,485 A | * | 4/1942 | Harris | 33/1 SB |
| 2,465,481 A | * | 3/1949 | Reiche | 33/430 |
| RE23,592 E | * | 12/1952 | Davenport | 33/431 |
| 3,393,458 A | * | 7/1968 | Freda | 33/431 |
| 3,630,435 A | * | 12/1971 | Titus | 235/78 R |
| 3,827,150 A | * | 8/1974 | Kubota | 33/1 SD |
| 5,431,046 A | | 7/1995 | Ho | |
| 5,435,069 A | * | 7/1995 | Nicholson | 33/304 |

FOREIGN PATENT DOCUMENTS

| | | | | |
|---|---|---|---|---|
| EP | 331544 A | * | 9/1989 | 33/1 SB |
| EP | 331 545 | | 9/1989 | |
| GB | 220072 A | * | 12/1989 | 33/304 |

* cited by examiner

*Primary Examiner*—Diego Gutierrez
*Assistant Examiner*—Stanley J. Pruchnie, Jr.
(74) *Attorney, Agent, or Firm*—Sughrue Mion, PLLC

(57) ABSTRACT

The invention relates to a deviation calculation rule of the circular type for the monitoring of a two-dimensional deviated well path. The rule consists of a support plate (10) on which is marked a circular dial with two semi-circular scales ($G_1$, $G_2$) graduated in degrees for locating the inclination angle at the entry point and the exit point of a section of path, at least two rotary disks (12, $12_1$) each marked with a plurality of concentric circles ($C_1$ through $C_n$; $C_1$ through $C'_n$ that each correspond to an inclination gradient for a specific drilled length (Gbu), at least one bi-sectoral disk (14) with, on its edges, scales (E1 through E4) used to locate the various Gbu circles on the disk being used (12), a first sliding system **(16*h*) allowing for a direct reading of the horizontal deflections and a second sliding system (16*v*)** allowing for a direct reading of the vertical depth deviations.

12 Claims, 7 Drawing Sheets

DEVIATION CALCULATION RULE USED TO MONITOR THE DRILLING PATH OF A TWO DIMENSIONAL DEVIATED HOLE

FIELD OF THE INVENTION

This invention relates to a deviation calculation rule used to provide a direct reading of all the necessary parameters and variables for monitoring the drilling path of deviated holes developed in a two dimensional geometric area thereby eliminating the traditional calculations that are done today using modem means of calculation, mainly computers.

Before going into detail about the deviation calculation rule, we will explain what two dimensional (2D) deviated holes are and will define the parameters and concepts the users of this rule will have to use.

HISTORY AND REMINDERS

In the early stages of oil drilling, wells were mostly vertical. Improvements in drilling techniques, the deepening of the pools, the discovery of new off shore oil fields and the cost of "offshore" infrastructures soon made it necessary to implement and improve techniques called deviation techniques. The deviation of a well consists in moving the path of a well away from the vertical line that passes through the wellhead, using a technique adapted thereto. The bottom of the well can therefore be moved by a certain lateral distance (that could be several km) in relation to the vertical line that passes through the wellhead. It then becomes possible to drill a greater number of wells whose paths are divergent from one same above-ground or offshore structure ("cluster" on land, offshore drilling rig or underwater "cluster"). These wells drain the oil from a relatively wide reservoir area compared to the space needed on the surface or at the bottom of the sea to exploit it.

Thus over the last fifty years, we have seen development taking place in a whole typology of deviated wells, among which we can name J wells, S wells, more or less complex horizontal wells, long deflection wells, multiple target wells, multi-lateral wells Whatever the degree of sophistication of these wells, they all have more or less complex paths that must be located in the space. There are two main classes of paths: two-dimensional paths and three-dimensional paths.

The difference between these two classes of paths is based on the manner in which the inclination and the azimuth move over most of the path. We remind you that the inclination at a given point of a path is the angle that is created, in a vertical plane, by the tangent to the path at this point and the vertical line that passes at this point and that the azimuth of the path at this point is the angle created between the vertical plane that contains the tangent to the path at this point and the geographical vertical plane of reference.

In a 2D path, the variations of the inclination over most of the sections of the well are usually very large compared to the variations of the azimuth. This means that the well remains, for the most part, in the same vertical plane. However, if the variations of the inclination and the azimuth came closer together in absolute values, the inclination and the azimuth would have to progress in completely separate ways, meaning one after the other but never at the same time if the path is to remain 2D.

In a 3D path, the variations of the inclination and the azimuth over most of the sections of the well are much closer in absolute values than in the 2D path. Over substantial portions of the well, the inclination and the azimuth move together in significant way.

This differentiation between the 2D and 3D paths is crucial because the deviation calculation rule that is the object of this invention is only used in cases involving 2D paths. We must however note that this field covers most of the paths that are drilled today.

PATHS AND SECTIONS

There are four different types of sections that constitute 2D paths:

vertical sections in which the value of the inclination is low and close to zero and in which the well's path moves very little laterally, in relation to the vertical line that passes through the wellhead;

- curved sections in which the value of the inclination may or may not start at zero and changes significantly compared to the value of the azimuth and in which the path of the well moves laterally in relation to the vertical line that passes through the wellhead in a given direction. These lateral movements generally tend to move the path of the well away from the vertical line that passes through the wellhead, but the opposite is possible and relates precisely to the case of "reverse curved" wells. Among the curved sections, we note positive curved sections in which the value of the inclination increases along the path and negative curved sections in which the value of the inclination decreases along the path. The curved sections may have a constant (arc of circle sections) or variable (catenary sections) curve radius;
- straight sections in which the inclination remains constant and equal to a given non null value and in which the path moves laterally in relation to the vertical line that passes through the wellhead in a given direction. As with the curved sections, the straight sections can move the path of the well away from to closer to the vertical line that passes through the wellhead;
- sections called navigation or pilot sections, specifically adjusted to the drilling of horizontal drains, in which the inclination changes a lot and tends to follow the dip of the geological beds, in sections, with areas called transition areas; in these sections, the inclination values of the path oscillate around the horizontal position (+ or −90° inclination, in a wide range from 70° to 120°); they consist of successions of curved sections and straight sections.

LOCATING THE 2D PATHS IN SPACE

In order to plan and monitor the 2D paths, they must be located in a two-dimensional space, meaning in a plane that, theoretically, consists of the vertical plane that contains the path. As shown in the enclosed FIG. 1, this plane P can be located in a local reference system through its azimuth a, the angle created by the plane P and a vertical reference plane $P_1$ that contains a fixed geographical landmark located on the surface. The path T, even a 2D type path, rarely develops in a single plane because it presents slight variations of the azimuth. This is why, for the monitoring of the path and the calculations related to it, we will choose as plane P a projection plane on which the path will be projected and this is also why, for the use of the deviation calculation rule, we will consider that the azimuth of the well remains mostly constant, which is an acceptable approximation.

Path T of the well is only known through deviation measurements that are carried out at certain points along the path, in general every drilled 30 m or in certain more critical cases, every drilled 10 m. In the purely 2D field, these are inclination measurements that are linked to drilled lengths in which the drilled lengths correspond for the most part to the cumulated length of the drill rods that are used to drill the well. The drill path is built through calculation, in sections, from these measurement points. In the purely 2D field, we graphically build the path by joining the successive points of measurement $M_1$, $M_2$ . . . with two types of curves: straight sections when the measurement of the inclination remains unchanged between the points of measurement, and arcs of circle when the measurement of the inclination has changed between the two points, whether upward or downward.

The plane P is defined by two orthogonal axes: a horizontal axis directed in the azimuth of the well path and a vertical axis directed downward. On the horizontal axis, for each deviation measurement, we note the cumulated horizontal deflection values DEP of the well, in relation to a geographic referential that can be the geographic position of the wellhead I. The reference is not necessarily the wellhead, it can also be the center of a rig, or any other point that serves as a common reference for a group of wells. For directional calculations we usually work in a local reference and make the origin of the axis coincide with the wellhead.

On the vertical axis, for each deviation measurement, we note the cumulated vertical depth values PV of the well, in relation to the topographic referential that can be the location of the wellhead. For directional calculations, we work with a local reference and make the origin of this axis coincide with a location that is accessible on the floor of the drilling device through which pass the drill rods that will constitute the string and whose cumulated measurement will make it possible to establish the drilled length.

In theory, this system of coordinates is sufficient to be able to locate the path point by point. On the other hand, the DEP and PV variables cannot be measured directly; they are obtained through calculations that require the knowledge of a number of elements (deviation measurements) and we must formulate a certain number of hypotheses (method of calculation and construction of the path) which we will address below.

Given that the curved section (arc of circle) involves the largest number of parameters, it is the one we will use in what follows in order to emphasize the various variables that make it possible to locate the path in space. The attached FIG. 2 represents a portion of the projection plane P that contains an arc of circle section A demarcated by an entry point E and an exit point S.

The DEP and PV variables are calculated using the following three parameters: the inclination $i_1$ measured at the point of entry E, the inclination $i_2$ measured at the point of exit S and the drilled length ΔLF between the point of entry and the exit point. A simple geometric calculation involving the bend radius R of the arc of circle section makes it possible to determine the horizontal deflection deviation ΔDEP and the vertical depth deviation ΔPV between points E and S of the arc of circle section being considered. These deviations (relative) are added or subtracted, depending on the case, from the previous accumulations in order to obtain the DEP and PV variables (absolutes) at a given point of the drilling path.

The values of these two variables are provided by the following formulas:

$$\Delta PV=180/\pi\cdot\Delta Lf/(i_2-i_1)\cdot(\sin i_2-\sin i_1) \tag{1}$$

$$\Delta DEP=180/\pi\cdot\Delta LF/(i_2-i_1)\cdot(\cos i_1-\cos i_2) \tag{2}$$

where $i_1$ and $i_2$ are expressed in degrees.

The main hypothesis that is made in the calculation of these variables is that the curved section is comparable to an arc of circle and therefore has a constant bend radius that is equal to the radius R of the arc or circle. The quantity $\Delta LF/(i_2-i_1)$ that appears in formulas (1) and (2) is precisely equal to the radius $R_1$ when $(i_2-i_1$is expressed in radians. The 180/π factor is a conversion factor that makes it possible to express $(i_2-i_1)$ in degrees.

We will note that the bend radius R is rarely used by drillers. They prefer the notion of "build-up" gradient (Gbu) which is the variation of the inclination over a given drilled length. This variation is positive when the value of the inclination increases over the section, and negative when it decreases. In this case where we compared the curve section between the two designed points to an arc of circle, the Gbu is of course considered as constant along this section.

PROCESSING OF THE DEVIATION CALCULATIONS

There are three distinct fields of application for the above-mentioned deviation calculations: planning of wells, monitoring the path and helping to make decisions using "blank" calculations and investigations around piloting hypotheses linked to the path of the well.

Planning the wells consists in building the theoretical path or the deviation plane. Yet in this area, the calculations are more complex essentially because of the accession of the horizontal wells. Indeed the paths are much harder to plan when we have to follow the geological beds governed by the laws of nature (case of the horizontal drains) than when passing through them locally, over a certain length (case of classic deviated wells).

Monitoring the path is essentially used to locate the drilled path and compare it directly to the theoretical curve that resulted from the planning. The calculations are done for each point of measurement. If in the case of classic deviated wells the deviation plane is followed to the letter, at least as far as its final objective of passing through the target is concerned, it is not so for most horizontal wells as the drain is piloted to follow the geological beds, with the result that the deviation plane quickly becomes obsolete and a systematic re-planning must take place during the acquisition of each new measurement.

The "blank" calculations and piloting scenarios are areas where the sum of the calculation has increased the most with the accession of the horizontal wells. The re-planning of the well with each new deviation measurement requires testing a certain number of hypotheses in order to be able to make the right decisions that pertain directly to the piloting of the drain hole. Furthermore, the overall improvement of drilling techniques and in particular of the transmission of deviation data in real time, has greatly complicated the job of the operator by reducing the reaction times.

We will note that for the planning and following of the path, all calculations must be done in absolute, meaning that the distances are cumulated in order to be able to locate the path in space, whereas repetitive "blank" calculations are relative, because what the operator is seeking in this case, are the variations of one or the other variable from a known starting point and under the influence of one or more parameters.

PRIOR ART

The afore-mentioned calculations cannot be ignored and are necessary to monitor and execute deviated or horizontal drillings. In the early days of deviated drilling, these calculations were done by hand or with the help of a calculator. Today, they are done either using a programmable calculator or a PC. However, these modem means of calculation do have a certain number of drawbacks:

- the safety rules relating to the risks of deflagration on the rig floor prohibit the use of a PC at this location. Therefore the PC must be kept away from the rig floor which is an important center of decision making since it is where the deviation measurements arrive first and foremost and where the path corrections will be applied.
- to solve a problem linked to the well path, the data are entered in the computer in the form of a series of numbers and in return, the solution is also offered by the computer in the form of a series of numbers. Yet the problem is geometric, and these series of numbers, obtained without any particular thinking challenge, do not sufficiently take into account the physical reality. Add to that fatigue and the operator could easily confuse the values or forget a sign that could be crucial;
- "blank" calculations, or some of them, have the added particularity of being performed in a repetitive mode, meaning that they only lead to the solution of the problem after trial and error. These repeated calculations are often very tedious;
- entering the data on the keyboard of the PC or programmable calculator quickly becomes a serious handicap on a work site since the operator does not always have clean hands and furthermore he may not have the necessary concentration to correctly type the problem's data on the small keys the first time around;
- computers are sensitive and fragile devices and they are subjected to the difficult conditions encountered on the sites, such as dust, sand, a more or less stable and filtered electric supply current. Furthermore, as they are not connected to the network, they must use a diskette to move data from one computer to another which is not a safe means of communication as the diskette may transmit a certain number of more or less aggressive viruses. Also, in such a context, computer failures cannot be excluded;
- the software used for directional monitoring is usually of the "multi-windows" type where one must open and close a certain number of windows before entering the data to a simple problem; these repeated operations easily become tiring after a while;
- even if computers are becoming a widely used technique, it is not always a unanimous decision to use them among some of the men on the site.

The object of this invention is to remedy the above-mentioned drawbacks linked to computers and programmable calculators and, with this in mind, it proposes to replace them with a calculation rule that can determine the various variables of directional drilling during the path monitoring and decision making stages. Of course, the rule offers the usual advantages peculiar to all calculation rules, namely:

- it can be used anywhere on the site, without any restrictions as to the area;
- it is operational as soon as it is taken out of its case;
- the calculations from the rule are performed in relative form, where knowledge of the well's history and path are not necessary for the rule to be immediately operational;
- no specific knowledge is required to use it and it represents the physical sizes handled by the user in more practical terms;
- it is not subject to any risk of failure, to which are added other advantages that will become apparent in the following pages.

SUMMARY OF THE INVENTION

Therefore, this invention relates to a deviation calculation rule of the circular type for the monitoring of a two-dimensional deviated well path, where this rule is characterized by the fact that is consists of:

- a support plate on which is marked a fixed circular dial used to locate or index the angle of inclination at the entry point of a section of the path and the angle of inclination at the exit point of said section, where said fixed dial has two semi-circular scales each graduated counter clockwise from 0 to 180° and whose common extremities are located on a diametral line of said dial, where the first scale represents the range of increase of the inclination when dealing with the problems linked to sections with positive curves and the second scale represents the range of decrease of the inclination when dealing with the problems linked to sections with negative curves.
- at least two interchangeable rotary disks used for indexing the entry inclination, choosing or locating the "build-up" gradient value and choosing or reading the drilled length on the interval being considered, where said rotary disks have a diameter that is slightly less than that of the circular dial and are stacked on the support plate concentrically to the dial in such a fashion that only the disk that is placed on the top is active and the other is kept on stand-by waiting to be used, where said rotary disks have a plurality of concentric circles each corresponding to an inclination gradient for a given drilled length (Gbu), so that the set of disks covers all the gradient values that are commonly found in practice, where each disk is divided by a diametral line that is used to locate and index the entry inclination value of said section on the scales of the circular dial marked on the plate, and that demarcates, on each of said concentric circles, a first semi-circular scale that is graduated counter clockwise in drilled lengths and makes it possible to work in the range of increase of the inclination and a second semi-circular scale graduated in the same way except clockwise, that makes it possible to work in the range of decrease area of the inclination, where the zero graduation of both these semi-circular scales coincide.
- at least one rotary bi-sectoral disk used for reading or indexing an exit inclination, or locating the "build-up" gradient value and managing the path calculations linked to the straight sections, where said bi-sectoral disk has the shape of two circular sectors diametrically opposed at their top, whose radius is less than that of the circular dial and is arranged above the rotary disks, concentrically to the latter, where one of the sectors of the bi-sectoral disk has a first graduated scale used to locate the Gbu circles of the active upper rotary disk on one of its radial edges, and a second scale used to locate the Gbu circles of the other rotary disk waiting to be used on the other radial edge, where said scales meet symmetrically on the radial edges of the other sector, and where said bi-sectoral disk also has a diametral line on each side of which are marked two scales head to tail, graduated in drilled lengths and used to deal with problems linked to straight lines, where said bi-sectoral disk and the rotary disks can be turned independently of each other, around a link element, such as an axis, that passes through them in their center and also passes through the support plate at the center of the circular dial, and adjustable sliding means that allow for either a simple reading, or the pre-selection of the deflection deviation or the vertical depth deviation at a given value, so as to determine the Gbu circle that corresponds to this deviation and read the drilled length on this circle, based on the entry and exit inclination values that correspond to the problem of the path in question.

According to a first mode of execution of the invention, said adjustable sliding rules include:

a first sliding system that consists of a straight slide track mounted in a sliding manner on the support plate, entirely outside the circular dial, a fixed rule and a mobile rule both perpendicular to the slide track and extending on the side of the circular dial, where the fixed rule is attached by one of its extremities to the track, whereas the mobile rule has one extremity that is mounted in a sliding manner in the slide track, a scale marked lengthwise on the slide track and whose zero coincides with the inside edge of the fixed rule;

and a second sliding system identical to the first sliding system, located outside the circular dial and extending perpendicularly to the first sliding system.

According to a second mode of execution whose object is to simplify the manufacture of the rule, said adjustable sliding means consist of:

a small rule mounted on the support plate parallel to the 0–180° diametral line of the circular dial and that can slide in a direction that is perpendicular to its own direction while covering the entire surface of the support plate.

a sliding element in the shape of a rectangular dial, also mounted on the support plate and of which one of the sides is assembled in a sliding manner to said small rule, in such a way that said dial shaped element can slide along said small rule parallel to said diametral line, where the four sides of the dial shaped element each have a graduated scale on their inside edge, and four cursors respectively mounted in a sliding manner on said sides of the dial shaped element so as to locate a particular chosen graduation on said graduated scales in order to pre-select values.

The invention will now be described in detail using the attached drawings where:

DETAILED DESCRIPTION OF THE PREFERRED MODES OF EXECUTION

Figure 1:
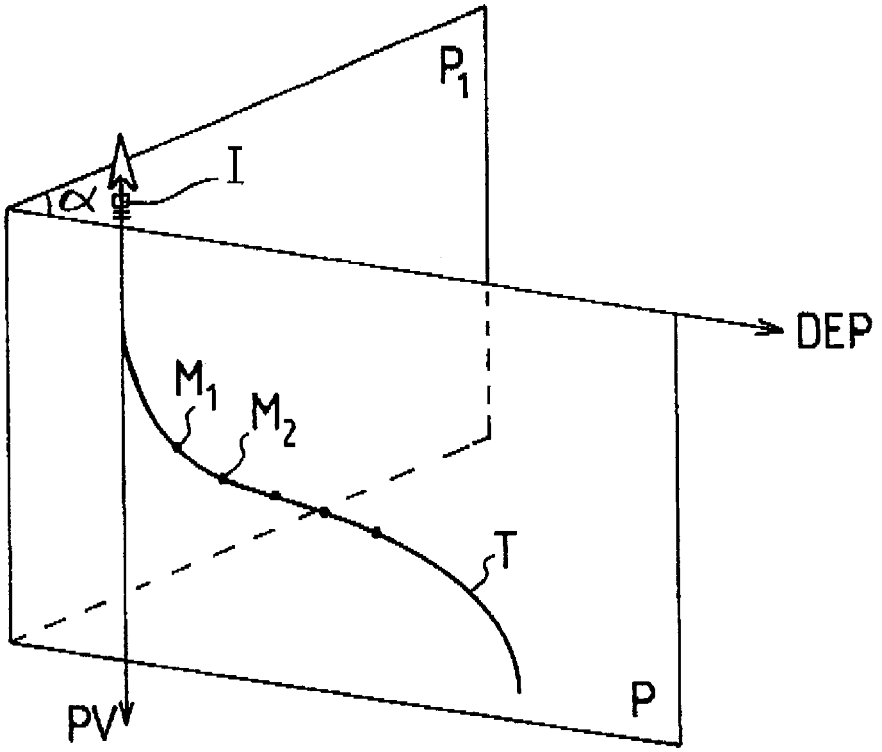
FIG. 1 represents a 2D well locating vertical plane.
Figure 2:
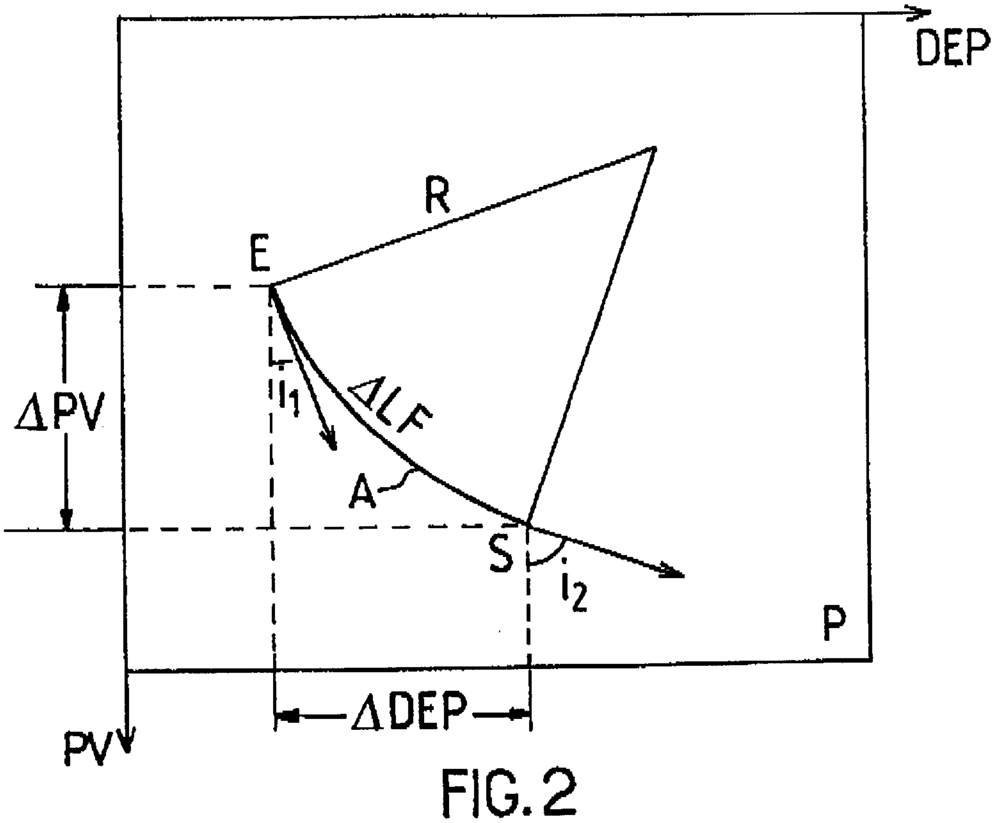
FIG. 2 represents the various search parameters of a portion of a 2D well in the vertical plane of FIG. 1.

I) Description of the Rule According to a first Mode of Execution.

The deviation calculation rule as set forth in the first mode of execution illustrated in FIGS. 3 through 6 consists of a support plate 10 for indexing and marking inclination angles at the entry and exit points of a section of the path, a plurality of rotary disks (for example two disks 12, 12$_1$) for indexing the entry inclination, marking or choosing the value of the "build-up" gradient and reading or choosing the drilled length over the interval in question, a rotary bi-sectoral disk 14 for reading or indexing an exit inclination, marking the value of the "build-up" gradient and managing the path calculations linked to the straight sections, a horizontal sliding system **16*h* for reading or pre-selecting the horizontal deflection deviations and a vertical sliding system 16*v*** for reading or pre-selecting the vertical depth deviations. Each of these components will now be described in detail.

Support Plate

The support plate consists of a light rigid plate, made for example of wood, chipboard, plastic, resin or a light metal, such as aluminum. The plate may be of any appropriate shape, but preferably it will be mostly square or rectangular. In its center it has a circular hole 20 with a flat bottom, intended to receive the rotary disks 12, 12$_1$ and the bi-sectoral disk 14 over the latter. The thickness of the plate and the depth of the hole will be made so as to be able to fit these three components in the hole in such a way that the upper surface of the bi-sectoral disk is flush with the supper surface of the plate. Marginal portions remain free on the plate in order to insert horizontal and vertical sliding systems as will be explained later.

Figure 3:
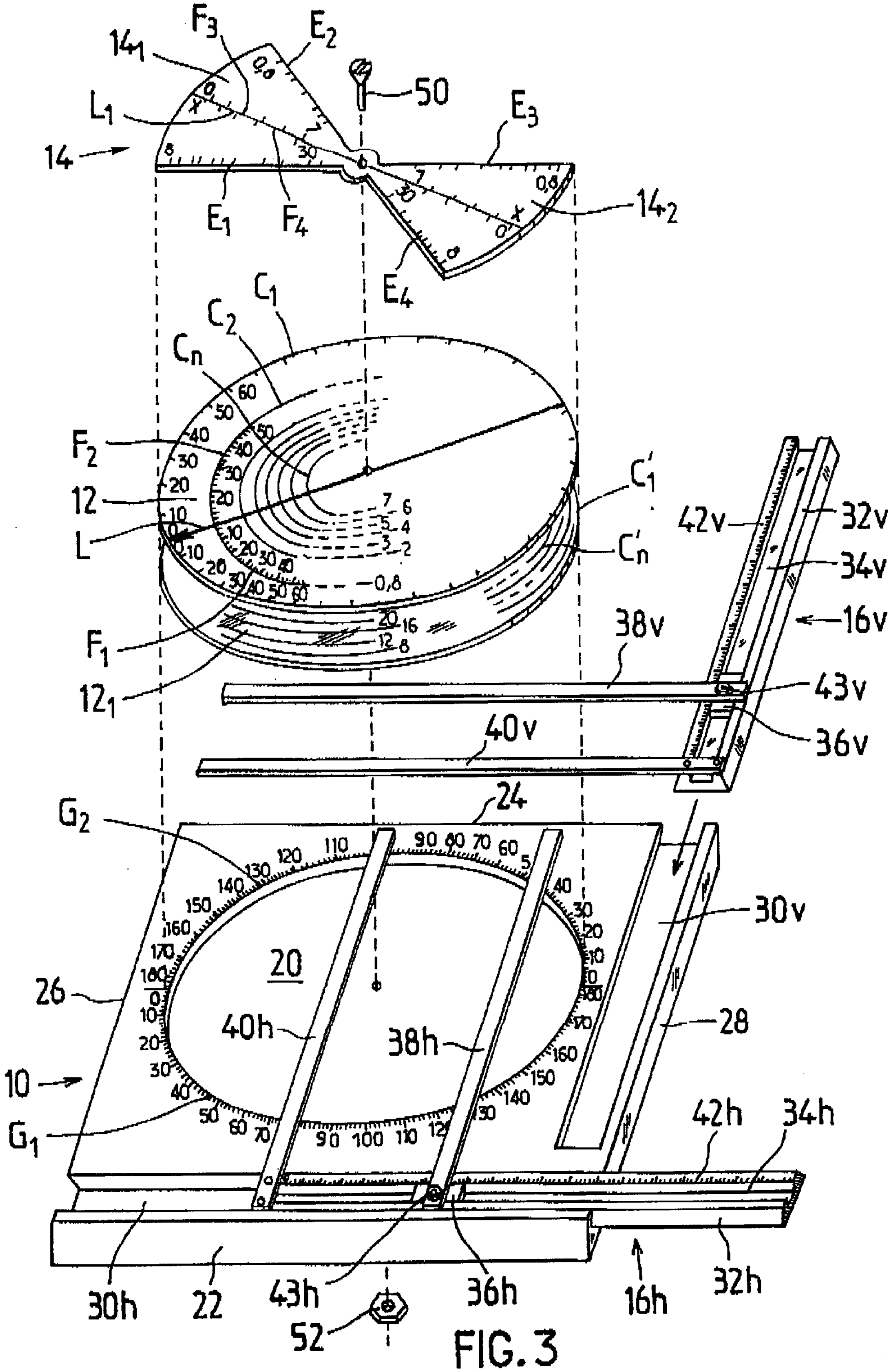
FIG. 3 is an exploded perspective view that shows the various components that make up the deviation calculation rule according to a first mode of execution of the invention.
Figure 4:
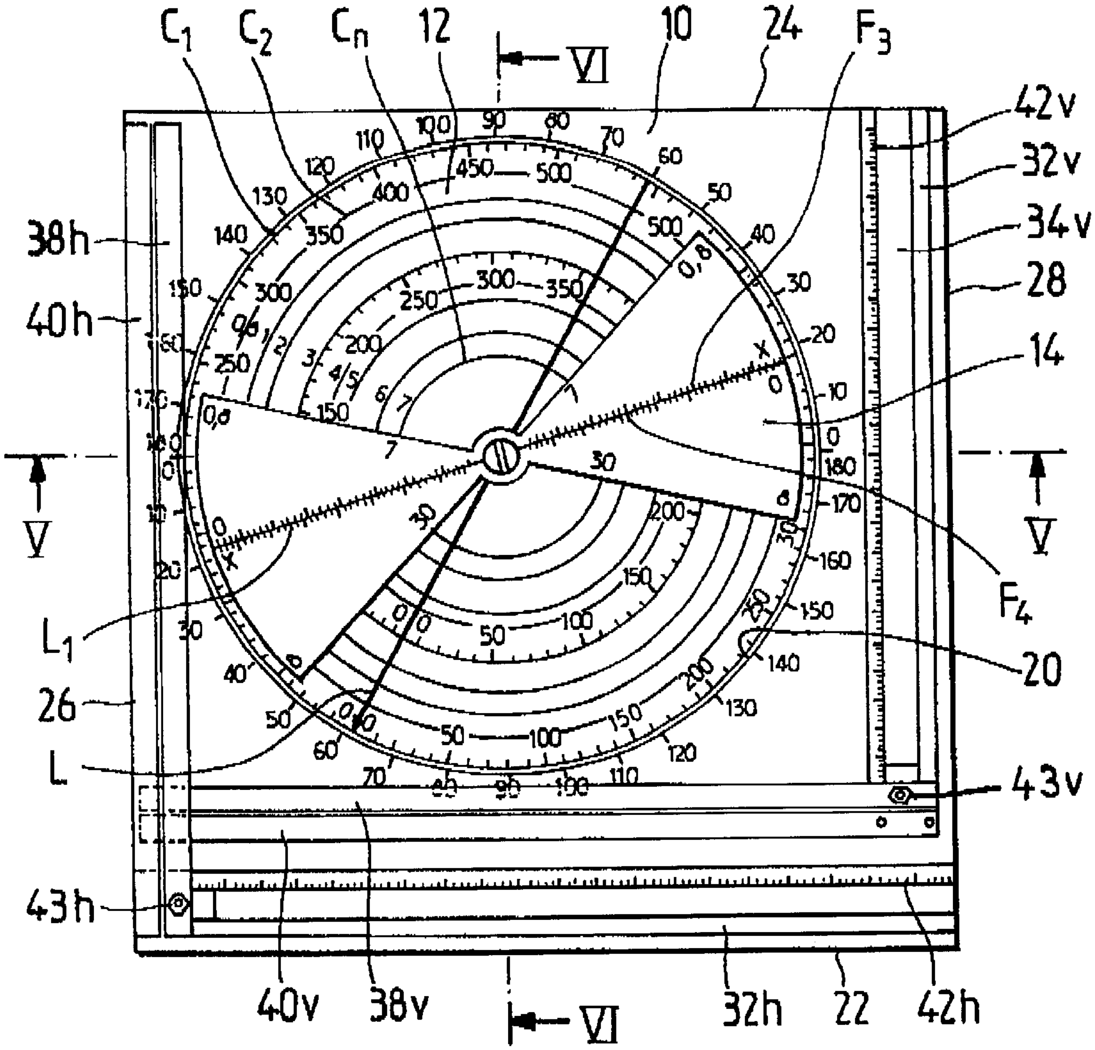
FIG. 4 is a plan view of the assembled deviation calculation rule of FIG. 3.

To make the description easier, we will assume the plate is set in its working position represented in FIGS. 3 and 4 where the user is on the edge 22 side of the plate. For this reason, we will call this edge the front side and the other three sides will respectively be referred to as back side 24, left side 26 and right side 28.

A circular dial with a first semi-circular scale $G_1$ graduated counter clockwise from 0 to 180° is marked around the circular hole 20 where graduation 0 is located on the left extremity of the horizontal diameter of the hole and graduation 180 is on the right extremity of this diameter. This scale, which therefore extends through the lower part of the plate or the side closest to the user, represents the range of increase of the inclination ($i_1 < i_2$) and makes it possible to deal with the problems of positive curve sections. It is used to index or mark the inclination of the entry point and the exit point of a curved section or to index the inclination of a straight section, as will be explained later.

A second semi-circular scale $G_2$ also graduated counterclockwise from 0 to 180° is marked around the hole 20, where this time the 0 and 180 graduations. are respectively located at the right and left extremities of said diameter. This second scale, which extends in the part of the plate that is farthest from the user, represents the range of decrease of the inclination ($i_1$>$i_2$) and makes it possible to deal with the problems of negative curve sections .

Sliding Systems

The horizontal 16*h* and vertical 16*v* sliding systems are made up of the same components. To make the description easier, we will designate the equivalent elements of these two systems by the same numeric references respectively assigned the h index for the horizontal system and the v index for the vertical system.

The horizontal system 16*h* consists of a slide track 32*h* mounted in a sliding manner in a groove 30*h* set, for ergonomic reasons, in the marginal part of the plate along the front edge 22 of the plate and parallel to said edge. The slide track itself consists of a groove 34*h* in which is mounted in a sliding manner a shoe 36*h* to which is attached the extremity of a mobile rule 38*h* perpendicular to the grove 34*h*. The rule 38*h* rests on the upper surface of the plate and it extends in a direction that is parallel to the sides 26 and 28 of the plate. A fixed rule 40*h* is attached on the left extremity of the slide track parallel to the mobile rule. Its length is the same as the latter and it also rests on the upper surface of the plate. The lengths of the rules 38*h* and 40*h* are roughly of the same length as sides 26, 28 of the plate so as to cover the entire surface of the hole 20 when they move.

A graduated scale 42*h* is marked on the slide track 32*h* and the zero coincides with the inside edge of the fixed rule 40*h*. This scale makes it possible to mark the position of the mobile rule 38*h* on the slide track and therefore to directly read the values of the horizontal deflection deviation ΔDEP, as will be explained later. The mobile rule 38*h* can be blocked in the chosen position using a tightening device such as a bolt 43*h* or other similar device in order to pre-select a deflection deviation value.

In a manner that is similar to what was described for the horizontal sliding system 16*h*, the vertical sliding system 16*v* is mounted, for ergonomic reasons, along the right side 28 of the plate. The vertical grooves 30*v* extend from the back edge 24 of the plate to a short distance from the horizontal groove 30*h*, but it can also open into the latter. The vertical slide track 32*v* is also equipped with a fixed rule 40*v* and a mobile rule 38*v* that is attached on a shoe 36*v*, which is mounted in a sliding manner along a groove 34*v* on the vertical slide track 32*v*. The rules 38*v* and 40*v* are parallel to the sides 22, 24 of the plate and are roughly of the same length as the sides so as to cover the entire surface of the hole when they move.

A scale 42*v* whose zero coincides with the inside edge of the fixed rule 40*v* is marked on the vertical slide track 32*v*. This scale makes it possible to mark the position of the mobile rule 38*v* on the slide track and therefore to directly read the values of the vertical depth deviation ΔPV, as will be explained later. The mobile rule 38*v* can be blocked in the chosen position using a tightening device, such as a bolt 43*v* or a similar device. We will note on FIG. 4 that there is a functional overlap between the rules 38*v*, 40*v* and 38*h*, 40*h*.

Rotary Disks

The rotary disks 12, 12$_1$ are each marked with a plurality of concentric circles $C_1$ through $C_n$ and $C'_1$ through $C'_n$ that each correspond to a defined inclination or "build-up" gradient (Gbu). There are two disks, in order to cover the entire range of "build-up" gradients commonly found in practice. For example, the Gbu circles of the first rotary disk 12 correspond to Gbus that increase from 0.8°/30 m to 7°/30 m from the periphery to the center of the disk, whereas the second disk covers a range of Gbus that increase from 8°/30 m to 30°/30 m from the periphery toward the center of the disk. Of course, we can add other disks to cover the Gbus that are greater than 30°/30 m.

Figure 5:
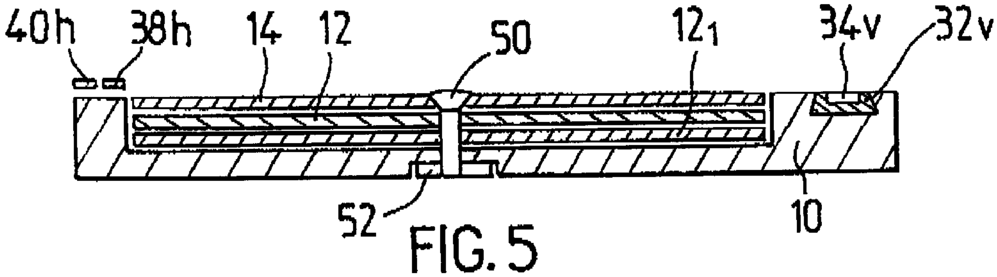
FIG. 5 is a sectional view that follows the V—V line of FIG. 4.
Figure 6:
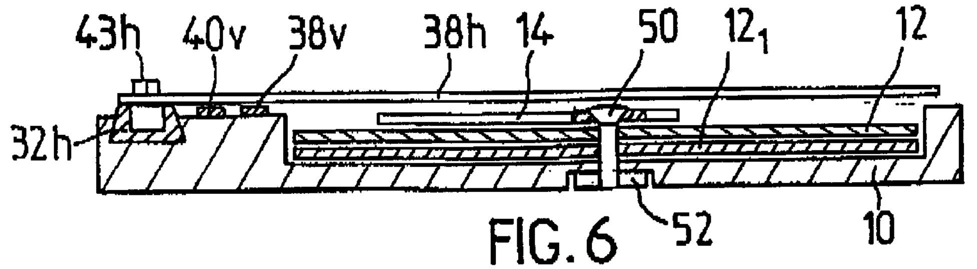
FIG. 6 is a sectional view that follows the VI—VI line of FIG. 4.
Figure 8:
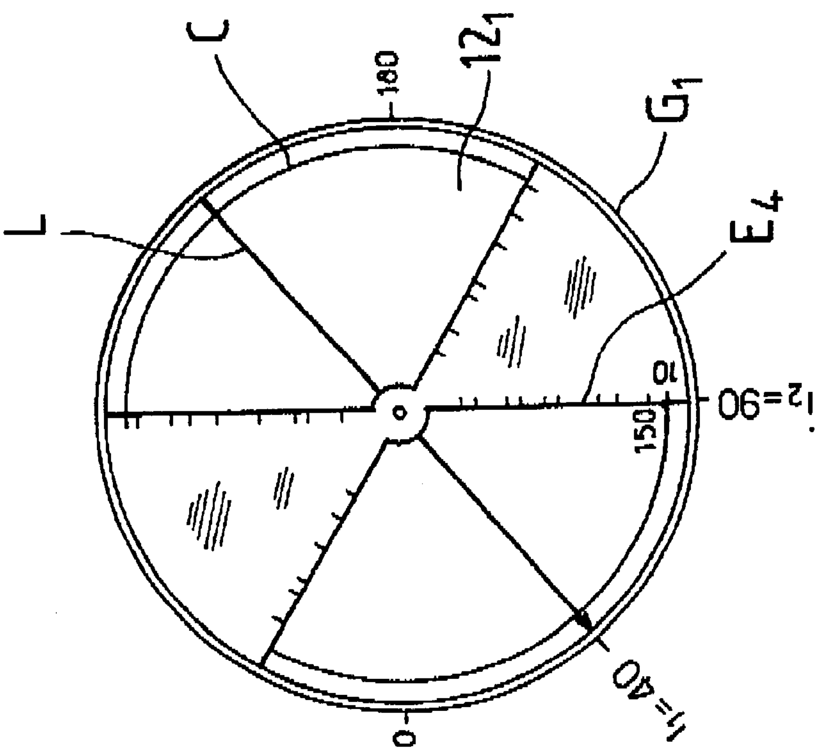
FIGS. 7 through 11 are partial views of the deviation calculation rule that respectively illustrate five examples of use of the rule according to the first mode of execution.

As shown in FIGS. 5 and 6, the rotary disks 12, 12$_1$ have a diameter that is slightly less than that of the hole 20 of the plate so they may fit into it in such a way that their peripheral edge with not rub against the edge of the hole. The rotary disk that is located above (in this case disk 12) is the disk that corresponds to the range of Gbus in which we are working, and the other disk (in this case disk 12$_1$) is stored under disk 12 waiting to be used.

On each of the disks 12, 12$_1$, the Gbu circles $C_1$ through $C_n$ and $C'_1$ through $C'_n$ each have two semi-circular scales $F_1$ and $F_2$ for reading the deviations of the drilled lengths, where these deviations are supposed to made up of a portion of an arc of circle taken on one of these circles. These scales are delimited one from the other by a diametral line L with at one of its extremities an arrow that is used to index the value of the entry inclination of a section in an arc of circle, as will be explained later.

One of the scales, F1, is located on the lower semi-circle; the drilled lengths are graduated on it counter clockwise from 0 through a certain number, based on the radius of said semi-circle. This lower part of the Gbu circles makes it possible to work in the range of increase of the inclination ($i_1$<$i_2$). The other scale, F2, is located on the upper semi-circle and the drilled lengths are graduated on it from 0 through a certain number clockwise. This upper part of the Gbu circles makes it possible to work in the range of decrease of the inclination ($i_1$>$i_2$). The 0 graduations of these two semi-circular scales coincide.

The 0.8°/30 m through 7°/30 m and 8°/30 m through 30°/30 m values for the Gbus of the rotary disks are only shown here as an example; the final execution of the rule and in particular the choice of the diameter of the rotary disks and/or the reading scales, can lead to other combinations of values of the Gbu circles.

Bi-sectoral Disk

The bi-sectoral disk 14 is made up of a rigid plate that may be transparent, but not exclusively. The bi-sectoral disk consists of two circular sectors 14$_1$, 14$_2$ that are diametrically opposite at the top and its diameter is roughly the same as that of the rotary disks 12, 12$_1$.

Sector 14$_1$ of the bi-sectoral disk consists of two radial edges that are graduated with different scales $E_1$, $E_2$ in build-up crescents from the periphery to the center. These scales are located symmetrically, in relation to a transversal axis, on sector 14$_2$ at $E_4$ and $E_3$ respectively. This two sector configuration with symmetrical scales makes it possible for the user of the rule to work in an ergonomic fashion, alternatively in the range of increase of the inclination and in the range of decrease of the inclination while limiting the size of the rotation of the bi-sectoral disk. The identical scales $E_1$ and $E_4$ are used to locate the Gbu circles $C'_1$ through $C'_n$ of the rotary disk 12, that cover the range of Gbus from 8°/30 m through 30°/30 m whereas the other two identical scales $E_2$ and $E_3$ are used to locate the circles $C_1$ through $C_n$ of the Gbus of the other rotary disk 12 that cover the range of Gbus from 0.8°/30 m through 7°/30 m. Furthermore, across from the corresponding rotary disk, one or the other of the radial edges of the sectors will be used to locate or index the exit inclination of the sector in question. In order to properly locate the useful graduation on the sectors, we will draw the scales $E_1$, $E_4$ on the one hand, and $E_2$, $E_3$ on the other hand, with two different colors and we will give the drawings of the two rotary disks the same respective colors as the scales $E_1$, $E_4$ and $E_2$, $E_3$.

Furthermore, the bi-sectoral disk has a diametral line $L_1$ that passes through its center of symmetry, and on either side of which are marked two identical graduated scales $F_3$, $F_4$ that represent the drilled lengths. The scale $F_3$ extends from the zero value located on the left of the scale to a value X located on the right of the scale and is based on the total diameter of the bi-sectoral disk. The scale $F_4$ extends in the opposite direction, head to tail, from the value zero located on the right of the scale to said value X located on the left of the scale. This arrangement makes it possible to use these scales no matter what the relative position of the bi-sectoral disk when we want to solve the problems tied to straight sections, by always these straight sections, by convention, from the left to the right. In this use, the inclination of the straight section is indexed by either extremity of the diametral line $L_1$ on the semi-circular scales $G_1$ and $G_2$ marked on the plate, in the left portion of these scales.

Still in the case of dealing with problems linked to straight sections, we can provide for a second marking superimposed on the semi-circular scales $G_1$ and $G_2$ in order to provide the user with direct reading. This marking, not represented so as not to clutter up the figures, will start (degree 0—vertical section) at the graduation 90 of the scale $G_2$ and will extend from this point counter clockwise. This marking can reasonably be interrupted at its graduation 150 (degrees of inclination) that corresponds to the graduation 60 of the scale $G_1$, which should leave enough of a margin since today we rarely progress at inclinations greater than 120 degrees.

The bi-sectoral disk presented above also makes it possible to locate the Gbus on the rotary disks 12 and $\mathbf{12_1}$. In the case where we would have to deal with Gbus that are greater than 30°/30 m, we will use, as has already been stated, a third rotary disk with Gbu circles that cover the values that are greater than 30°/30 m, and in this case, we will have to replace the bi-sectoral disk 14 with a second bi-sectoral disk adjusted to said third disk. Given that the maximum Gbu encountered in practice rarely exceeds 90°/30 m, one rotary disk, and only one, would be necessary and therefore, a mono-sectoral disk would be more than enough to cover the Gbu values that are greater than 30°/30 m.

We will note that all of the rule's scales that express distances, meaning scales $F_1$, $F_2$, $F_3$, $F_4$, 42*h* and 42*v*, are compatible and practical. By compatible we mean that their divisions and sub-divisions are the same from one scale to another, and by practical we mean that they are legible and remind the user of the reading of measuring instruments found in every life, such as rules, dual decimeter, etc . . . For example, we can imagine that in its most practical version, the deviation calculation rule adopts the millimeter as the finest sub-division for measuring distances and lengths; in this case, with a Gbu disk of 0.8°/30 m to 7°/30 m, 1 mm on the scale of drilled lengths would for example be worth 10 m in reality (reminder, the length of a drill rod is approximately 9 m). With a disk with a Gbu of 8°/30 m through 30°/30 m, 1 mm on the scale of drilled lengths would for example be worth, 1 m in reality, which is compatible with the need to work in a manner that is more and more precise as the value of the Gbu increases.

The rotary disks 12, $\mathbf{12_1}$ and the bi-sectoral disk are mounted in a rotary manner in the hole 20, independently of each other and they can be rotated around an axis 50, for example a screw or a bolt that passes through them in their center and also passes through the bottom of the circular hole in its center to screw into a nut 52.

The graduation mode of the diametral line $L_1$ is only given here as an example. Based on the diameter of the rotary disks, the practical scales for reading the lengths may be different from one rotary disk to another; in this case, the two graduated scales $F_3$, $F_4$ will both extend in the same direction, from the zero value located on the left of the scale to a value X located on the right of the scale that is based on the total diameter of the bi-sectoral disk, where each of the scales extends on either side of the line $L_1$. In order to clearly distinguish the useful scale on the line $L_1$, we will draw the scales $F_3$ and $F_4$ while respecting the various colors we gave by convention to the drawings of the two rotary disks, as stated earlier.

Various Operating Modes for the Rule According to the First Mode of Execution of the Rule Whatever the operating modes of the deviation calculation rule, one must handle the following six parameters or variables that were defined earlier: the inclination $i_1$ at the entry point of the curved section, the inclination $i_2$ at the exit point of the curved section, the deviation of the drilled length ΔLF between the entry point and exit point, the horizontal deflection deviation ΔDEP between these two points, the vertical depth deviation ΔPV between these two points, and the variation of the Gbu inclination on the drilled length between these two points, in degrees/30 m.

Each of these parameters or variables can in turn take on the following roles: it can be either origin data, known as being correct at the time of the problem we want to solve, or a target value, meaning a constraint that we impose, or yet an estimated value that is unknown and cannot be determined, or lastly a deduced or unknown value we must find through the calculation.

We will now describe several practical examples for using the deviation calculation rule while referring to FIGS. 7 through 11, these examples are of course only a few of the many uses for the rule. In the same way we explained the operation of the rule in the case of curved sections (arc of circles) because these sections have the largest number of variables, we will also provide hereafter practical examples of use for the rule chosen in the area of curved sections of the well. In order to make this clear and simple, we have represented the bi-sectoral disk in FIGS. 7 through 11 without its diametral line, since this line is not involved in the examples that will follow. Also, we have only chosen examples that relate to the range of increase of the inclination ($i_1<i_2$). However, these examples are reversible, meaning they can be transposed into the range of decrease of the inclination ($i_1>i_2$). Note also that all the examples that will follow involve, either in fact or in principle, the range of Gbus from 8°/30 m to 30°/30 m; this is why we are using disk $\mathbf{12_1}$ in these examples.

1$^{st}$ Use (Extrapolation of the inclination to the drill bit)

All deviation calculations must start with this first simple calculation, unless the string is equipped with a metering instrument for the inclination at the level of the drill bit. Indeed, the meter that measures the inclination of the well is located more or less far away from the drill bit. Therefore, it is important to extrapolate the inclination at the comer of the drill bit in order to be able to make good decisions in terms of piloting.

The problem to solve appears in the particular case of the following numerical example: the last measurement of the inclination was 20°. We suppose that the distance between the sensor that gave this measurement of inclination and the comer of the drill bit is 16 m and that the estimated Gbu over this interval is of 15°/30 m and we would like to know the inclination at the level of the drill bit.

Figure 7:
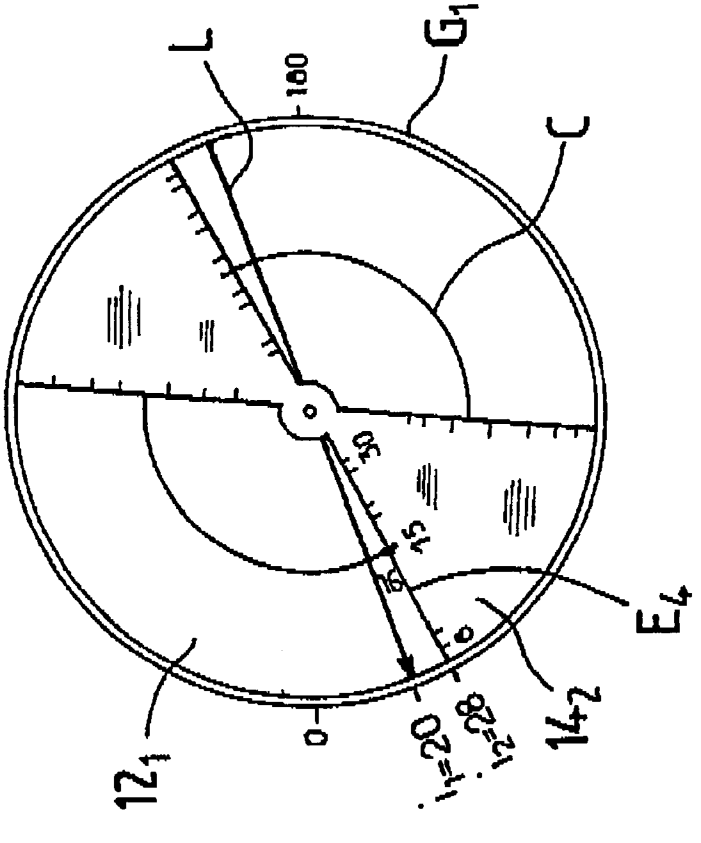

We will now explain how we proceed to solve this problem with the rule while referring to FIG. 7:

We rotate the Gbu disk 12$_1$, to index the graduation $i_1$=20° of the lower angular scale $G_1$ using the arrow that is located at the extremity of the leader line L since the given Gbu is positive, then we mark the circle C of the Gbu that corresponds to the estimated value of 15° (for 15°/30 m) using the graduated scale $E_4$ located on the edge of sector 14$_2$ of the bi-sectoral disk. This circle is the one that is opposite graduation 15 of the scale $E_4$. We then rotate the bi-sectoral disk to make its graduated edge $E_4$ coincide with graduation 16 (for 16 m of drilled length) of the circle C. At the outside extremity of said graduated edge $E_4$ we then read the indexed graduation of 28° on the lower scale $G_1$.

This is the sought value of $i_2$ that corresponds to the value of the inclination of the drill bit.

2$^{nd}$ Use (Seeking the Number of Meters Left to Drill)

We will outline the problem to be solved in the context of the following numerical example: we suppose that the entry inclination $i_1$=40° and we hope to reach a target value for the exit inclination $i_2$=90° by drilling with an estimated Gbu of 10°/30 m and we would like to know the ΔLF length to drill in order to reach this target. We will explain how we proceed using the rule while referring to FIG. 8.

We rotate the Gbu disk 12$_1$, to index the graduation $i_1$=40°, using the arrow located at the extremity of the marker line L in the lower angular scale $G_1$, then we mark the Gbu circle C using the graduation 10 (for 10°/30 m) of the graduated scale $E_4$ of sector 14$_2$. Then we rotate the bi-sectoral disk to index the value $i_2$=90° on the lower angular scale $G_1$, using the scale $E_4$ of sector 14$_2$ and we read the graduation that is located across from the outer extremity of the scale $E_4$ on said circle. We come up with 150 m, which is the sought value of ΔLF that corresponds to the length that is left to drill.

3$^{rd}$ Use (Passing to a Target Inclination for a Restricted Value in a Vertical Depth)

Figure 9:
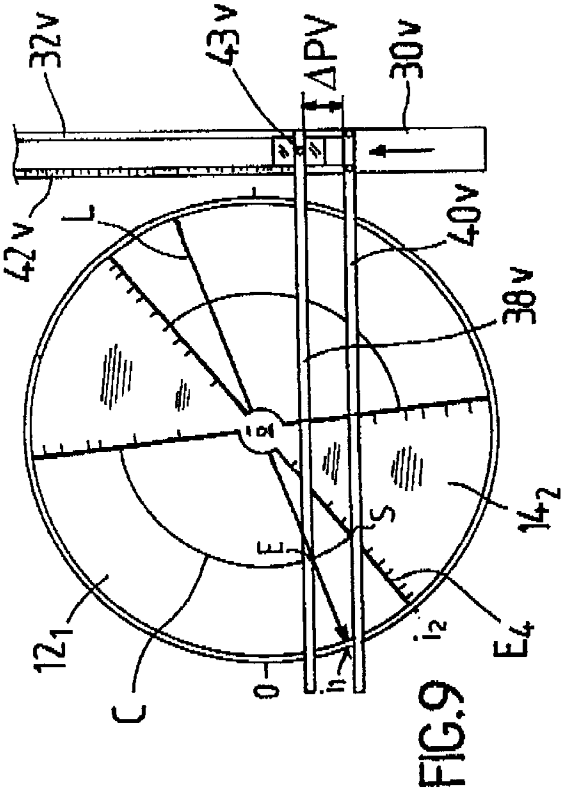

The problem to solve is the following: the entry inclination $i_1$ being given, we wish to pass from the entry inclination $i_1$ to the exit inclination $i_2$, considered as a target value, in a limited vertical deviation, and we would like to know the drilled length ΔLF and the Gbu. Referring to FIG. 9 we will explain how to proceed in order to solve this problem using the rule:

We rotate the Gbu disk 12$_1$ to index the known value $i_1$ of the lower angular scale using the arrow located at the extremity of the leader line L, then we rotate the bi-sectoral disk to bring the graduated scale $E_4$ of sector 14$_2$ over the target value $i_2$ of the lower angular scale of disk 12$_1$. We then move the mobile rule 38*v* away from the fixed rule 40*v* of the vertical sliding system 16*v* by a distance marked on the scale 42*v* that corresponds to the given value of the desired ΔPV and we block the mobile rule in this position using the screw 43*v*. Lastly, we slide the slide track 32*v* from the bottom to the top in the grove 30*v*, until we locate the Gbu circle C, whose entry point E, marked by the line L, corresponds to the internal generator of the mobile rule 38*v*, and whose exit point S which is marked by the scale $E_4$ of sector 14$_2$ coincides with the internal edge of the fixed rule 40*v*.

If we cannot find a Gbu circle that meets this condition using the disk 12$_1$ that is in place on the plate, we will have to replace it with one of the other disks to cover greater or smaller gradient values, based on the case in question. When the sought value overlaps two circles engraved on the disk, the operator will have to extrapolate the Gbu value.

Once we have found the Gbu circle, we read the Gbu facing it on the scale $E_4$ of sector 14$_2$ and along said circle we read the ΔLF value that is equal to the length of the ES arc.

Figure 10:
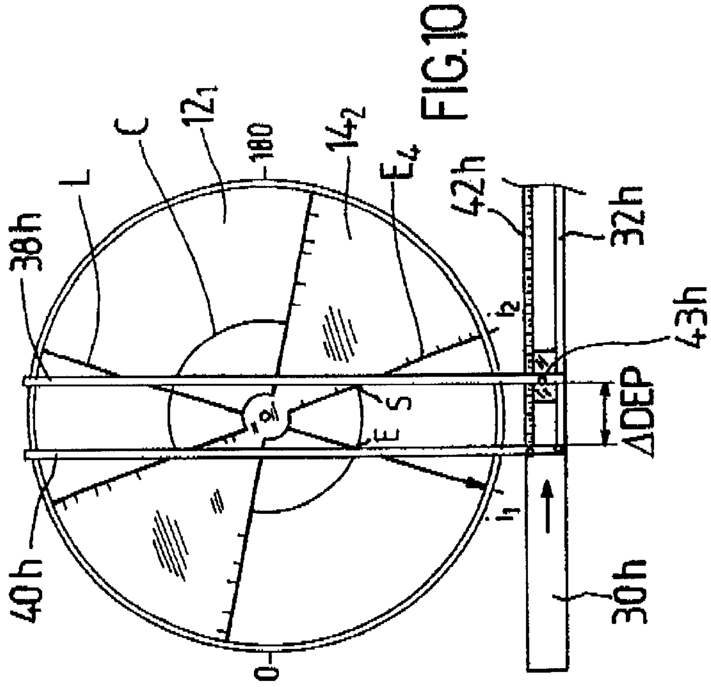

4$^{th}$ Use (Passing to a Target Inclination for a Horizontal Deflection Restricted Value) We provide the entry inclination $i_1$ and we wish to pass from the entry inclination $i_1$ to the exit inclination $i_2$, considered as a target value, in a restricted horizontal deflation deviation. We propose to find the drilled length ΔLF and the Gbu. FIG. 10 illustrates how to proceed with the rule:

We rotate the Gbu disk $^{12}{}_1$ to index $i_1$ on the lower angular scale $G_1$, using the arrow that is located at the extremity of the leader line L, then we rotate the bi-sectoral disk to index $i_2$ on the lower angular scale $G_1$, using the scale $E_4$ of sector 14$_2$. We then move the mobile rule 38*h* away from the mobile rule 40*h* of the horizontal sliding system by a distance that corresponds to the desired ΔDEP value and we block the mobile rule in this position using the screw 43*h*. Then, we slide the slide track 32*h* from left to right in the grove 30*h* of the plate 10 until we find the Gbu circle C, whose entry point E, marked by the line L, coincides with the internal generator of the fixed rule 40*h* and whose exit point S, marked by the scale $E_4$ of sector 14$_2$, coincides with the generator of the mobile rule 38*h*.

If we cannot find a Gbu circle using the disk 12$_1$ that is in place, we must replace it with one of the other disks to obtain greater or smaller gradient values depending on the case. When the sought value overlaps two circles engraved on the rotary disk, the user must extrapolate the Gbu value.

Once the Gbu circle has been found, we read the Gbu facing it on the scale $E_4$ of the sector 14$_2$ and along said circle we read the ΔLF value that is equal to the length of the arc ES.

5$^{th}$ Use (Evaluation of the Average Gbu on a Curved Section) Today, many inclination increase stages are performed using downhole motors equipped with a swiveling elbow on the bottom part of the motor. These motors work according to two distinct modes: the mode called directed and the mode called rotary.

In the directed mode, the string is stopped in rotation and the elbow is pointed in the direction in which we want to direct the string. In a 2D field, this means pointing it either toward the top or toward the bottom. It is in this directed mode that the motor develops its capabilities to increase or decrease the inclination, for a given angle of the elbow, based on a yield linked to the characteristics of the rocks that are drilled through.

On the other hand, in the rotary mode, the string is lead in rotation. Under these conditions the downhole motor drills a widened hole, but in theory it loses its capacity to increase or decrease the inclination and drills a straight section with a constant inclination, which it does with a relatively good yield that once again depends on the characteristics of the rocks through which we are drilling. Therefore, any directed drilling with a downhole motor consists in alternating the periods of rotation and non rotation of the string in order to obtain the desired Gbu. One of the means to control this consists in discovering this “average Gbu” (including the stages of rotation and orientation) through the results of the deviation measurements.

Figure 11:
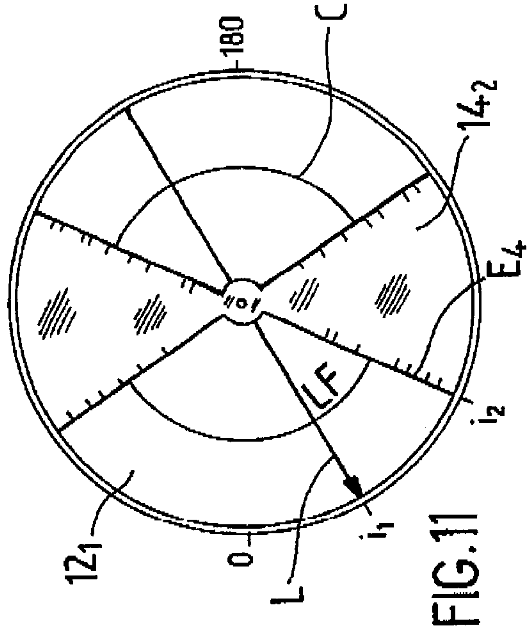

In this use, we provide the entry inclination $i_1$, the exit inclination $i_2$ and the drilled length ΔLF and we propose to find the average Gbu. The solution to this problem is illustrated in FIG. 11. We proceed as follows with the rule:

We rotate the Gbu disk 12$_1$ to index the known value $i_1$ on the lower angular scale $G_1$ using the arrow located at the extremity of the leader line L, then we rotate the bi-sectoral disk to index the value $i_2$, on the lower angular scale using the scale $E_4$ of sector 14$_2$, we then look for the Gbu circle C that develops the given value of ΔLF between $i_1$ and $i_2$. The Gbu is read on the scale $E_4$ of sector $14_2$.

If we cannot find a Gbu circle that meets this conditions using the disk $12_1$, which is in place on the plate, it must be replaced with one of the other disks to cover the larger or smaller gradient values, depending on the case in question. If the sought value overlaps between two circles engraved on the disk, the operator will have to extrapolate the value of Gbu.

II) Description of the Rule According to the Second Mode of Execution

Figure 12:
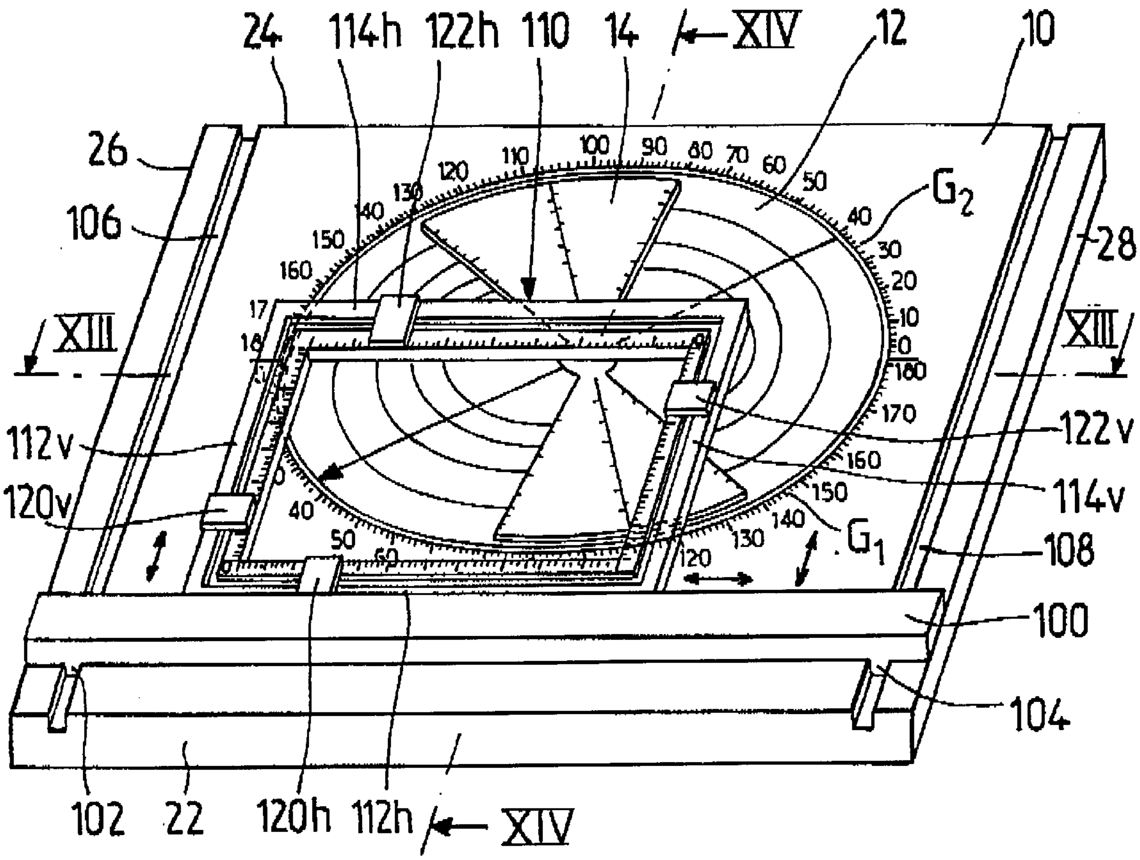
FIG. 12 is a perspective view of a deviation calculation rule according to a second mode of execution of the invention whose object is to simplify the manufacture of the rule.
Figure 13:
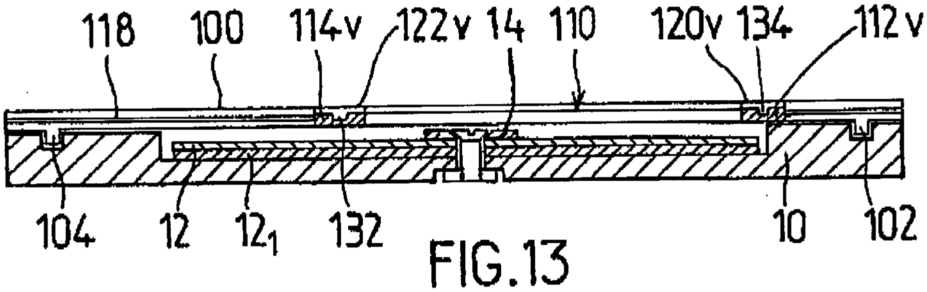
FIG. 13 is a sectional view that follows XIII—XIII line of FIG. 12.
Figure 14:
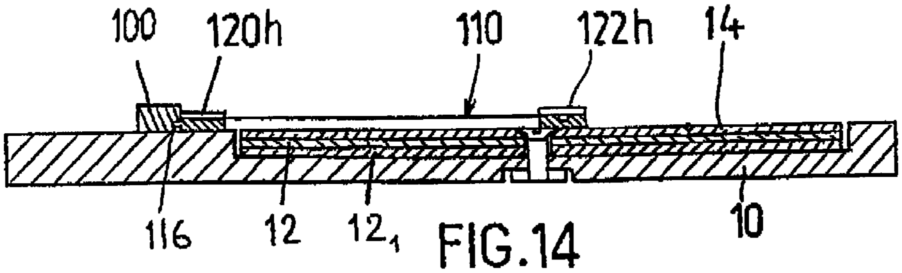
FIG. 14 is a sectional view that follows XIV—XIV line of FIG. 12.

We will now describe the second mode of execution of the deviation calculation rule as set forth in the invention, referring to FIGS. 12 through 14. This rule is similar to that of FIG. 4. The components of this rule are similar to those of the rule in FIG. 4 and therefore will not be described in detail and will be designated by the same numerical references.

The deviation calculation rule represented in FIGS. 12 through 14 also consists of a support plate 10 with its graduated semi-circular scales $G_1$, $G_2$, rotary disks, such as 12, $\mathbf{12_1}$ and one bi-sectoral disk 14.

Instead of the horizontal and vertical sliding systems, the deviation calculation rule consists of a small rule 100 whose length is more or less equal to the front and back sides 22, 24 of the support plate. The small rule is arranged on the plate parallel to said sides and it can slide parallel to the lateral sides 26, 28 of the support plate while being guided by projections 102, 104 , dovetailed for example, set close to the extremities of the small rule and inserted in the groves 106, 108 on the support plate.

A component in the shape of a rectangular dial 110 with two horizontal sides **112*h*, 114*h* parallel to the front and back sides of the support plate and two vertical sides 112*v*, 114*v* parallel to the left and right sides of the support plate is mounted in a sliding manner along the small rule. The sliding of component 110 is guaranteed for example through a link with ribs 116 and groves 118 between the horizontal side 112*h* of said component and the small rule 100**.

By analogy to the sliding systems of the first mode of execution of FIG. 4, we will call the sides **112*h*, 114*h* horizontal sides and in the same way, 112*v*, 114*v*** will be called vertical sides.

The horizontal sides **112*h* and 114*h*** have identical graduated scales that make it possible to read or pre-select the horizontal deflection deviation values.

To be more precise, side **112*h* is intended for work in the lower area of the rotary disks, for increasing values of the inclination ($i_1<i_2$). Most uses of side 112*h* for the purpose of measuring the deflection deviation will lead to a reading from left to right. Consequently, side 112*h* will be mainly graduated on its upper edge, from left to right, where the zero is then located on the left of the scale as represented in FIG. 12. However, when measuring the deflection deviations in the area of inclinations that are strictly greater than 90 degrees, it is necessary to provide for the use of a means for reading the deflection deviation from right to left where this time the zero is located on the right of the scale, and this so the user benefits from the direct reading of this deviation. In order to cover this case in both these figures, side 112*h* will have a single scale, whose length will be a multiple of the division unit (for example the centimeter) with two graduations, of which one extends from left to right and the other (not represented) extends from right to left. To determine the measurement (width) of the graduated scale located on the side 112*h***, we will take into account the following two conditions: 1) the scale must be able to cover the 0 to 120 degree inclination range in terms of horizontal deflection for the largest of the Gbu circles, 2) the two graduations must fall exactly in the same divisions.

Side **114*h* is intended for work in the upper area of the rotary disks, for decreasing values of the inclination ($i_1>i_2$). Most uses of side 114*h* for the purpose of measuring the deflection deviation, will lead to a reading from right to left. Therefore, side 114*h* will mainly be graduated on its inside edge, from right to left, where the zero is therefore located on the right of the scale as represented in FIG. 12. However, when measuring the deflection deviations in the area of inclinations that are strictly greater than 90 degrees, it is necessary to provide for a means for reading the deflection deviation from left to right, where this time the zero is located on the left of the scale and this so that the user can benefit from the direct reading of this deviation. In order to cover both cases in the figures, side 114*h* will have one single scale with two graduations where one extends from right to left and the other (not represented) extends from left to right. The measurement (width) of the graduated scale located on the side 114*h* is the same as that on the edge 112*h***.

Also, the vertical sides **112*v*, 114*v*** have identical graduations that make it possible to read or pre-select the vertical depth deviation values ΔPV.

To be more precise, side **112*v* is intended for work in both the lower and the upper areas of the rotary disks, for increasing values of the inclination ($i_1<i_2$) and for decreasing values of the inclination ($i_1>i_2$). The use of side 112*v* for the purpose of measuring the vertical depth deviation will then lead to reading from either top to bottom or bottom to top depending on the area of the measurement. For the purpose of covering both figures, side 112*v* will only have one graduated scale, with a length that is a multiple of the division unit (for example the centimeter) equipped with two graduations. One of the graduations extends from bottom to top with the zero therefore located at the bottom of the scale, as represented in FIG. 12 and the other graduation extends from top to bottom with the zero thus being located at the top of the scale. In order to determine the measurement (height) of the graduated scale 112*v***, we will take into account the following two conditions: 1) that the scale be able to cover the entire area of inclination from 0 to 90 degrees in terms of the vertical depth deviation for the largest of the Gbu circles, or a length that is equivalent to at least one radius of the rotary disks 2) that the two graduations fall exactly in the same divisions.

Side **114*v* will be used in the exact same way as side 112*v* and in the same areas. Consequently, everything that was said or explained for side 112*v*** is valid, in particular the scales and graduations that are found in an analogous and symmetrical manner.

Sliding cursors **120*h*, 122*h*, 120*v*, 122*v* are mounted on the four sides of the component 110 and are intended to locate and pre-select specific horizontal deflation deviation and vertical depth deviation values on graduated scales. The cursors can be assembled on the sides of component 110 by any means that will allow them to slide, for example a rib 132 and grove 134** assembly that fits one in the other.

The deviation calculation rule as set forth in this mode of execution is simpler than that of the previous mode of execution because there are only two sliding components, namely the small rule 100 and the dial shaped component 110, whereas in the previous mode of execution, there are four components: the slide tracks **32*h*, 32*v* and the mobiles rules 38*h*, 38*v***.

Furthermore, the dial shaped component 110 is more resistant than the sliding systems 16*h*, 16*v* due to the fact that the fixed rules 40*h*, 40*v* and the mobile rules 38*h*, 38*v* are only anchored by one of their extremities and may therefore break off.

Lastly, the deviation calculation rule as set forth in this mode of execution is easier to handle than that of the previous execution. It allows for a reading in all possible cases, as will become obvious in the following examples of use.

First Use of the Rule in FIG. 12

Figure 15:
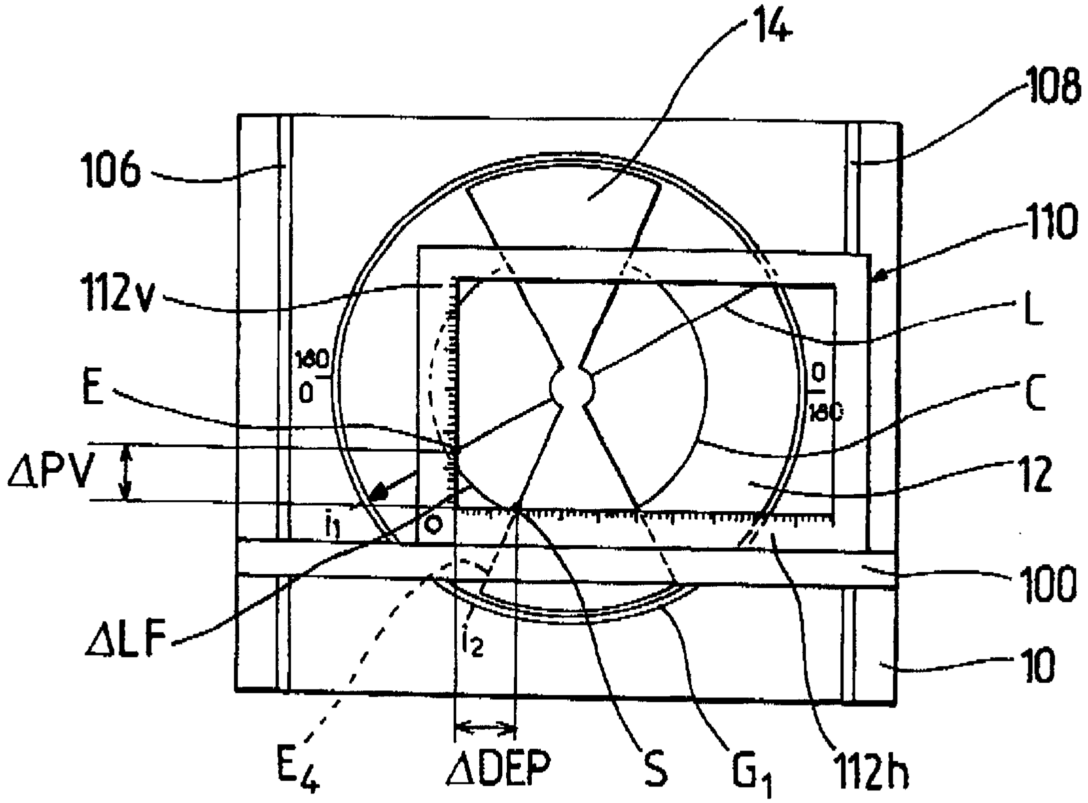
FIGS. 15 and 16 illustrate two examples of use of the deviation calculation rule of FIG. 12.

This example of use is illustrated by FIG. 15. It corresponds to the range of increase of the inclination ($i_1<i_2$) with $i_1<90°$ and $i_2<90°$, and a Gbu equal to a value that corresponds to the Gbu circle C. We want to find the horizontal deflection, the variation of the vertical depth and the drilled length.

To solve the problem, we proceed as follows: we rotate the Gbu disk 12 to index the graduation $i_1$ in the lower semi-circular scale $G_1$ using the arrow of the leader line L. We then rotate the bi-sectoral disk 14 to coincide its graduated scale $E_4$ with the graduation $i_2$ on the lower scale $G_1$. We then slide the dial shaped component 110 so that the inside edge of its left vertical side 112*v* passes by the intersection point E of the leader line L and the circle C. Lastly we slide the small rule 100 along the groves 106, 108 so that the inside edge of the front horizontal side 112*h* of the component 110 passes by the intersection point S of the graduated scale $E_4$ and the circle C. The drilled length is the length ΔLF of the arc ES read on the circle C. The horizontal deflection deviation ΔDEP, is read directly on the graduated scale of the front horizontal side 112*h*; it is the length of the segment OS, where O is the origin of said scale. The variation of the vertical depth ΔPV is read on the graduated scale on the left vertical side 112*v* of the component 110: it is the length of the segment OE.

Conversely, if the horizontal deflection deviation or the vertical depth variation are origin data, we will note their value using the cursors on the appropriate side of the dial shaped component 110. The operating mode for finding the other parameters from these noted values is easily deduced from the previous example.

Second Use of the Rule in FIG. 12

Figure 16:
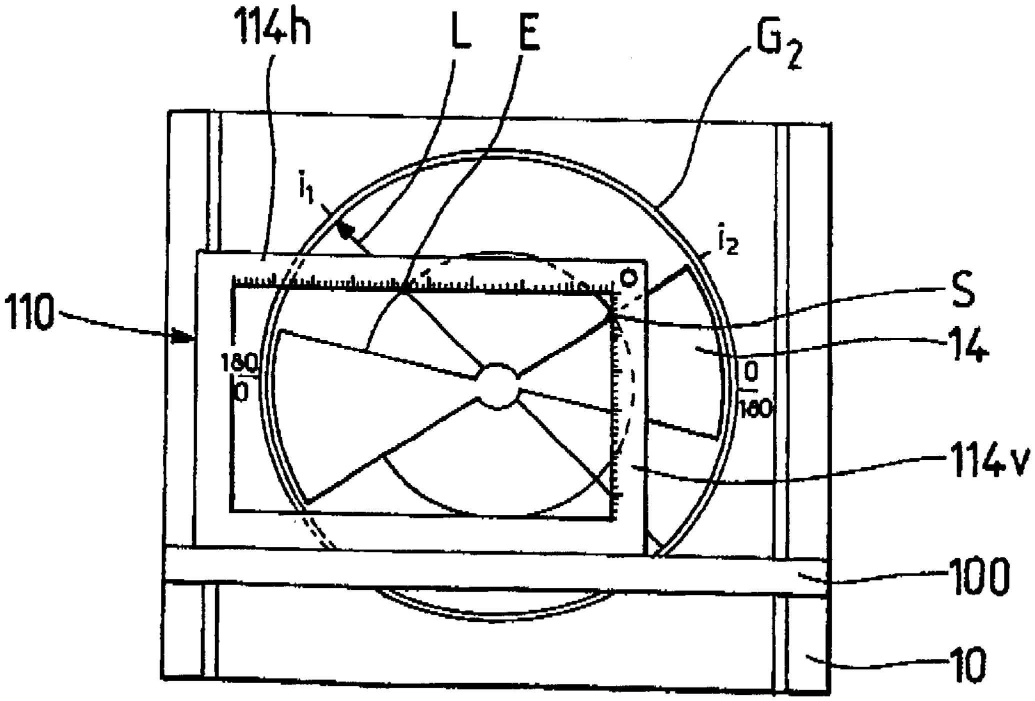

This example of use is illustrated by FIG. 16. It corresponds to the decreases in inclination ($i_1>i_2$) with $i_1>90°$ and $i_2<90°$. The operational mode of the rule is the same as in the previous example with the exception that the angles $i_1$ and $i_2$ are located on the upper semi-circular scale $G_2$. Note that in this example, the horizontal deflection deviation and the vertical depth variation are read on the back horizontal side 114*h* and the right vertical side 114*v* respectively.

We understand that based on the values of $i_1$ and $i_2$, the horizontal deflection deviations and the vertical depth deviations will be read on one or the other of the four sides of the dial shaped component.

What is claimed is:

1. Deviation calculation rule of the circular type for monitoring a two-dimensional deviated well path, characterized by the fact that it comprises:

a support plate (10) on which is marked a fixed circular dial used to locate or index the inclination angle ($i_1$) at the point of entry (E) of the section of the path and the inclination angle ($i_2$) at the exit point (S) of said section, where said fixed dial consists of two semi-circular scales ($G_1$, $G_2$) each graduated counter clockwise from 0 to 180°, where the first ($G_1$) represents the area of increase of the inclination ($i_1<i_2$) and the second ($G_2$) represents the area of decrease of the inclination ($i_1>i_2$);

at least two interchangeable rotary disks (12, 12$_1$) for indexing the entry inclination, choosing or locating the "build-up" gradient value and choosing or reading the drilled length over the desired interval, where the diameter of said rotary disks is slightly less than that of the circular dial and the disks are stacked on the support plate (10), concentrically to the dial, so that only the disk that is placed on top is active and the other waits to be used, where said rotary disks have a plurality of concentric circles ($C_1$ through $C_n$; $C'_1$, through $C'_n$) each corresponding to an inclination gradient per given drilled length (Gbu), so that all the disks cover all the values of the gradients commonly encountered in practice, where each disk is divided by a diametral line (L) used to locate and index the entry inclination value of said section on the circular dial scales and demarcate on each of said concentric circles, a first semi-circular scale ($F_1$) graduated counter clockwise in drilled lengths and making it possible to work in the area of increases of inclination and a second semi-circular scale ($F_2$) graduated m the same way but clockwise and making it possible to work in the area of deceases of the inclination, where the zero graduations of these two semi-circular scales coincide;

at least one bi-sectoral rotary disk (14) for reading or indexing an exit inclination, locating the value of the "build-up" gradient and managing path calculations linked to straight sections, where said bi-sectoral disk has the shape of two circular sectors (14$_1$, 14$_2$) diametrically opposite at their top and with a radius that is less than that of the circular dial and arranged above the rotary disks, concentrically to the latter, where one (14$_1$) of the sectors of the bi-sectoral disks has a first graduated scale ($E_1$) used to locate the Gbu circles ($C'_1$ through $C'_n$) of the rotary disk (12$_1$) on one of its radial edges, and a second scale ($E_2$) used to locate the Gbu circles ($C_1$ through $C_n$) of the other rotary disk (12) on its other radial edge, where said scales coincide symmetrically (at $E_4$, $E_3$ respectively) on the radial edges of the other sector (14$_2$), and said bi-sectoral disk also has a diametral line ($L_1$) on which are marked on each of its sides two scales ($F_3$, $F_4$) graduated, top to tail, in drilled lengths and used to deal with problems linked to straight sections, where said bi-sectoral disk as well as the rotary disks can be rotated independently of each other, around a link component (50) such as an axis, that passes through their center and also passes through the support plate at the center of the circular dial, and adjustable sliding means (16*h*, 16*v*; 100, 110) that allow for a simple reading or pre-selection of the deflection deviation or the vertical depth deviation at a given value, so as to determine the Gbu circle that corresponds to this deviation and read the drilled length on this circle.

2. Deviation calculation rule as set forth in claim 1, characterized by the fact that said adjustable sliding means comprises:

a first sliding system (16*h*) consisting of a straight slide track (32*h*) mounted in a sliding manner on the support plate, in a groove (30*h*) located entirely outside the circular dial, a fixed rule (40*h*) and a mobile rule (38*h*)

both perpendicular to the slide track and extending on the circular dial side, where the fixed rule is attached by one of its extremities to the slide track, whereas the mobile rule has an extremity that is mounted in a sliding manner in the slide track and a scale (42*h*) marked lengthwise to the slide track and whose zero coincides with the inside edge of the fixed rule, and a second lateral sliding system (16*v*) identical to the first sliding system, located outside the circular dial and extending perpendicularly to the first system.

3. Deviation calculation rule as set forth in claim 1, characterized by the fact that said adjustable sliding mean comprises:

a small rule (100) mounted on the support plate (10) parallel to the 0–180° diametral line of the circular dial and that can slide in a direction that is perpendicular to its own direction while covering the entire surface of the support plate, a sliding component (110) in the shape of rectangular dial also mounted on the support plate and of which one of the sides (112*h*) is assembled in a sliding manner to said small rule, so that said dial shaped component can slide along said small rule parallel to said diametral line, where the four sides (112*h*, 112*v*, 114*h*, 114*v*) of the dial shape component each have a graduated scale on their inside edge, and four cursors (120*h*, 120*v*, 122*h*, 122*v*) respectively mounted in a sliding manner on said sides of the dial shaped component so as to locate a specific chosen graduation on said graduated scales.

4. Deviation calculation rule as set forth in claim 1, characterized by the fact that the support plate (10) is comprised of a plate that is roughly square or rectangular, in the center of which there is a circular hole (20) with a flat bottom and whose diameter is slightly greater than that of the rotary disks (12, 12$_1$) and of the bi-sectoral disk (14), by the fact that the two rotary disks are arranged in the hole and the bi-sectoral disk is arranged above the rotary disks, by the fact that the depth of the hole is such that the upper surface of the bi-sectoral disk is flush with the upper surface of the plate, by the fact that the two semi-circular scales ($G_1$, $G_2$) are marked on the edge of the hole and by the fact that the marginal portions are left free on the plate so as to introduce horizontal and vertical sliding systems.

5. Deviation calculation rule as set forth in claim 1, characterized by the fact that the first semi-circular scale ($G_1$) extends in the lower part of the plate that is located closest to the use, the 0 graduation on this scale is located on the left extremity of the diameter of the hole which is horizontal for the user and the 180 graduation is located on the right extremity of this diameter and by the fact that the second semi-circular scale ($G_2$) extends in the part of the plate that is farthest from the user, where the 0 and 180 graduations of this second scale are respectively located at the right and left extremities of said diameter.

6. Deviation calculation rule as set forth in claim 2, characterized by the fact that the grooves (30*h*) of the horizontal sliding system (16*h*) are formed in the margin portion of the plate located along the edge (22) that is closest to the user, by the fact that the fixed rule (40*h*) is fixed on the extremity of the sliding track (32*h*) located on the left in relation to the user, by the fact that the grooves (30*v*) of the vertical sliding system (16*v*) are formed in the margin part of the plate located along the edge (28) that is to the right of the user and by the fact that the fixed rule (40*v*) is fixed to the extremity of the sliding track (32*v*) that is closest to the user.

7. Deviation calculation rule as set forth in claim 1, characterized by the fact that it consists of two interchangeable rotary disks (12, 12$_1$) on which are engraved a plurality of Gbu circles ($C_1$ through $C_n$; $C'_1$, through $C'_n$) to cover the Gbu values commonly encountered in practice.

8. Deviation calculation rule as set forth in claim 7, characterized by the fact that the first rotary disk (12) is engraved with a plurality of Gbu circles from 0.8°/30 m to 7°/30 m, whereas the second rotary disk (12$_1$) is engraved with a plurality of Gbu circles from 8°/30 m to 30°/30 m.

9. Deviation calculation rule as set forth in claim 1, characterized by the fact that in the case where we would need to handle Gbus that are greater than 30°/30 m, we use a third rotary disk with Gbu circles that cover the values that are greater than 30°/30 m and we replace the bi-sectoral disk (14) with a second bisectoral disk or a mono-sectoral disk whose radial edges have scales that correspond to said greater Gbu values.

10. Deviation calculation rule as set forth in claim 1, characterized by the fact that on the radial edges of the sectors (14$_1$, 14$_2$) of the bi-sectoral disk there are two scale systems ($E_1$, $E_4$and $E_2$, $E_3$) that make it possible to read the Gbu values on the two rotary disks (12, 12$_1$) both in the increase area of the inclination and the decrease area of the inclination.

11. Deviation calculation rule as set forth in claim 1, characterized by the fact that on one extremity of the mobile rules (38*h*, 38*v*) of the sliding systems there is a shoe (36*h*, 36*v*) that is mounted in a sliding manner in the grooves (34*h*, 34*v*) set on the slide tracks (32*h*, 32*v*) and that can be immobilized in a respective chosen position on said slide tracks using a tightening component, such as a bolt (43*h*, 43*v*).

12. Deviation calculation rule as set forth in claim 1, characterized by the fact that all the scales that express distances ($F_1$, $F_2$, $F_3$, $F_4$, 42*h* and 42*v*) are identical from one scale to the other and adopt the millimeter as the finest subdivision, where one millimeter is then equivalent for example to 10 m with the disk (12) of the Gbus from 0.8°/30 m to 7°/30 m and to one meter with the disk (12$_1$) of the Gbus from 8°/30 m to 30°/30 m.

* * * * *